US012607768B2

(12) United States Patent
Chen et al.

(10) Patent No.: US 12,607,768 B2
(45) Date of Patent: Apr. 21, 2026

(54) RADIOGRAPHIC INSPECTION DEVICE AND METHOD OF INSPECTING OBJECT

(71) Applicants: Tsinghua University, Haidian District (CN); NUCTECH COMPANY LIMITED, Haidian District (CN)

(72) Inventors: Zhiqiang Chen, Haidian District (CN); Li Zhang, Haidian District (CN); Yi Cheng, Haidian District (CN); Qingping Huang, Haidian District (CN); Mingzhi Hong, Haidian District (CN); Minghua Qiu, Haidian District (CN); Yao Zhang, Haidian District (CN); Jianxue Yang, Haidian District (CN); Lei Zheng, Haidian District (CN)

(73) Assignees: Tsinghua University, Haidian District (CN); NUCTECH COMPANY LIMITED, Haidian District (CN)

( * ) Notice: Subject to any disclaimer, the term of this patent is extended or adjusted under 35 U.S.C. 154(b) by 255 days.

(21) Appl. No.: 18/284,913

(22) PCT Filed: Jan. 18, 2022

(86) PCT No.: PCT/CN2022/072498
§ 371 (c)(1),
(2) Date: Sep. 29, 2023

(87) PCT Pub. No.: WO2022/206129
PCT Pub. Date: Oct. 6, 2022

(65) Prior Publication Data
US 2024/0103196 A1     Mar. 28, 2024

(30) Foreign Application Priority Data
Mar. 30, 2021   (CN) .......................... 202110344211.7

(51) Int. Cl.
*G01V 5/226*       (2024.01)

(52) U.S. Cl.
CPC ..................................... *G01V 5/226* (2024.01)

(58) Field of Classification Search
CPC ........... G01V 5/226; G01V 5/00; G01V 13/00
See application file for complete search history.

(56) References Cited

U.S. PATENT DOCUMENTS 4,862,005 A * 8/1989 Johnson ................. G21C 17/00
                                                        250/336.1
4,866,277 A * 9/1989 Johnson .................... G01T 1/18
                                                        250/336.1
(Continued)

FOREIGN PATENT DOCUMENTS

CN        204269845 U      4/2015
CN        205349190 U      6/2016
(Continued)

OTHER PUBLICATIONS

International Search Report with Written Opinion for PCT application No. PCT/CN2022/072498 dated Apr. 20, 2022 (9 pages).
(Continued)

*Primary Examiner* — David J Makiya
*Assistant Examiner* — Fani Polyzos Boosalis
(74) *Attorney, Agent, or Firm* — Merchant & Gould P.C.

(57) ABSTRACT

A radiographic inspection device and a method of inspecting an object are provided. The radiographic inspection device includes a support frame, where an inspection space applicable to inspect an object is formed within the support frame, and the inspection space has a first opening connecting to an outside; a transfer mechanism applicable to carry the object and move through the inspection space; a shielding curtain mounted at the first opening; and a driving mechanism. The driving mechanism includes: a driver mounted on the support frame; and a joint portion, where an upper end of the shielding curtain is connected to the joint portion. The driver is configured to synchronously drive two (Continued)

ends of the joint portion, so that the shielding curtain moves up and down with the joint portion to open or close the first opening.

18 Claims, 11 Drawing Sheets

(56)                References Cited

U.S. PATENT DOCUMENTS

| | | | |
|---|---|---|---|
| 11,289,225 B2 | 3/2022 | Bermuth | |
| 2015/0212229 A1 | 7/2015 | Walcher | |
| 2016/0025888 A1* | 1/2016 | Peschmann | G01V 5/228 |
| | | | 378/57 |
| 2021/0151212 A1 | 5/2021 | Bermuth | |
| 2022/0051826 A9 | 2/2022 | Bermuth | |

FOREIGN PATENT DOCUMENTS

| | | | | |
|---|---|---|---|---|
| CN | 208942180 U | 6/2019 | | |
| CN | 209360719 U | 9/2019 | | |
| CN | 209606628 U | * 11/2019 | | G01V 5/00 |
| CN | 209780712 U | * 12/2019 | | E06B 9/11 |
| CN | 210622666 U | 5/2020 | | |
| CN | 211698236 U | 10/2020 | | |
| CN | 211984912 U | * 11/2020 | | A47H 5/03 |
| EP | 2444585 A2 | 4/2012 | | |
| JP | 3113068 U | 9/2005 | | |
| WO | 2019016365 A1 | 1/2019 | | |

OTHER PUBLICATIONS

English Translation of International Search Report for PCT Application No. PCT/CN2022/072498 mailed Apr. 20, 2022 (2 pages).
First Chinese Office Action dated Apr. 13, 2023 for Application No. 202110344211.7 (11 pages).
Second Chinese Office Action dated Jul. 26, 2023 for Application No. 2021 10344211.7 (3 pages).

\* cited by examiner

RADIOGRAPHIC INSPECTION DEVICE AND METHOD OF INSPECTING OBJECT

This application is a National Stage Application of International Application No. PCT/CN2022/072498, filed 18 Jan. 2022, which claims benefit of Serial No. 202110344211.7, filed 30 Mar. 2021 in China, and which applications are incorporated herein by reference. To the extent appropriate, a claim of priority is made to each of the above disclosed applications.

TECHNICAL FIELD

Embodiments of the present disclosure relate to a radiographic inspection device, and in particular to a radiographic inspection device applicable to inspect an object carried on a transfer apparatus, and a method of inspecting an object using the radiographic inspection device.

BACKGROUND

In a field of non-invasive inspection of objects such as luggage or packages, an X-ray inspection device is often used to inspect objects for a presence of prohibited items such as drugs and explosives. The object to be inspected usually pass through an inspection space of the X-ray inspection device by means of a conveyor structure, and a radiographic emission apparatus emits X-rays into the inspection space to realize an inspection of the object. Generally, in existing radiographic inspection devices, shielding curtains, such as lead materials, are mounted at an entrance and an exit of the inspection space, so as to shield the X-rays inside the radiographic inspection device, thereby preventing X-rays from leaking.

Shielding curtains in current practical applications are all distributed fixed suspensions. To ensure an effectiveness of shielding X-rays, a low end of the shielding curtain is in contact with a conveyor belt moving in a transfer mechanism. During an inspection process, an object to be inspected enters an inspection region of the inspection space through a power of the conveyor belt to push open the shielding curtain at the entrance. After the inspection is completed and the object passes through the inspection space, it is required to push open the shielding curtain at the exit again through a dragging of the conveyor belt to move away from the inspection space, so that the object moves away from the radiographic inspection device.

In the existing radiographic inspection device, the shielding curtain mounted at the exit and the shielding curtain mounted at the entrance are fixed on a support frame of the radiographic inspection device. Due to a relatively heavy nature of the shielding curtain, it is impossible to push open the shielding curtain to enter the inspection region for a lighter-weight object to be inspected. On the contrary, when the shielding curtain is pushed open by the object too early, a leaking of X-ray may be inevitably caused.

In another type of radiographic inspection device, multiple shielding curtains are distributed in the inspection space. In this way, no matter at the entrance or the exit, when one shielding curtain is pushed open, other shielding curtains are remained closed, thereby ensuring to prevent X-rays from leaking. However, in this type of radiographic inspection device, it is required to have a certain length of inspection space to meet requirements of shielding X-rays, so that a longer inspection space is required and a larger space is occupied.

SUMMARY

The purpose of the present disclosure is to solve at least one aspect of the above problems and defects in the existing technologies.

According to an embodiment of an aspect of the present disclosure, a radiographic inspection device is provided, including a support frame, where an inspection space applicable to inspect an object is formed within the support frame, and the inspection space has a first opening connecting to an outside; a transfer mechanism applicable to carry the object to move through the inspection space; a shielding curtain mounted at the first opening; and a driving mechanism. The driving mechanism includes: a driver mounted on the support frame; and a joint portion, where an upper end of the shielding curtain is connected to the joint portion. The driver is configured to synchronously drive two ends of the joint portion, so that the shielding curtain moves up and down with the joint portion to open or close the first opening.

According to an embodiment of the present disclosure, the driving mechanism further includes a transmission mechanism, where the driver drives the joint portion to rise or fall through the transmission mechanism.

According to an embodiment of the present disclosure, the driver includes a motor. The transmission mechanism includes a driven shaft mounted on an upper part of the support frame and driven to rotate by the motor; two first rollers respectively mounted near two ends of the driven shaft and configured to rotate with the driven shaft; two second rollers respectively mounted on two opposite upright frames of the support frame, and respectively located below the two first rollers; two conveyor belts each wrapped around one of the two first rollers and one of the two second rollers, where two ends of the joint portion are respectively connected to the two conveyor belts.

According to an embodiment of the present disclosure, the joint portion includes a main body portion having a shape of strip, where the upper end of the shielding curtain is connected to the main body portion; and two guide mechanisms respectively disposed at two ends of the main body portion, where each guide mechanism is applicable to fit with the upright frame to guide the joint portion to move up and down along the upright frame.

According to an embodiment of the present disclosure, each guide mechanism includes a first pulley apparatus disposed at two ends of the main body portion and extending into a guide groove formed in the upright frame, so as to rotate by abutting against a side wall of the guide groove, where the guide groove extends in an upright direction on the upright frame.

According to an embodiment of the present disclosure, each guide mechanism further includes: a sliding block disposed at two ends of the main body portion and slidably extending into a guide groove formed in the upright frame, where the guide groove extends in an upright direction on the upright frame.

According to an embodiment of the present disclosure, the guide structure further includes a second pulley apparatus mounted on a lower side of two ends of the main body portion, where pulleys of the second pulley apparatus are rotatably in contact with a bottom of the guide groove.

According to an embodiment of the present disclosure, the transmission mechanism further includes a counterweight, where the counterweight is connected between the two conveyor belts, so as to balance a weight of the joint portion and a weight of the shielding curtain.

According to an embodiment of the present disclosure, the transmission mechanism further includes a limiting apparatus applicable to limit a range of movement of the joint portion in the upright direction.

According to an embodiment of the present disclosure, the limiting device includes: a first proximity switch mounted on the support frame; and a matching switch mounted on the joint portion, where the driving mechanism stops driving the shielding curtain to rise in response to the matching switch being close to the first proximity switch.

According to an embodiment of the present disclosure, the limiting apparatus includes a second proximity switch mounted on the support frame, where the driving mechanism stops driving the shielding curtain to fall in response to the matching switch being close to the second proximity switch.

According to an embodiment of the present disclosure, the radiographic inspection device further includes a first detection apparatus, where the driving mechanism drives the shielding curtain to rise, in response to the first detection apparatus detecting that the object carried on the transfer mechanism is located on an outer side of the support frame and is getting close to the shielding curtain, so as to allow the object on the transfer mechanism to move into an interior of the inspection space.

According to an embodiment of the present disclosure, the radiographic inspection device further includes a second detection apparatus, where the driving mechanism drives the shielding curtain to fall to an initial position, in response to the second detection apparatus detecting that the object carried on the transfer mechanism moves in the support frame away from the shielding curtain.

According to an embodiment of the present disclosure, the radiographic inspection apparatus further includes a third detection apparatus, where the transfer mechanism rotates in a reversing direction to drive the object to move towards the first opening, in response to the third detection apparatus detecting the object carried on the transfer mechanism.

According to an embodiment of the present disclosure, the driving mechanism drives the shielding curtain to rise, in response to the transfer mechanism rotating in the reversing direction and the second detection apparatus detecting that the object carried on the transfer mechanism is in the support frame and is getting close to the shielding curtain, so as to allow the object on the transfer mechanism to move outside the inspection space.

According to an embodiment of the present disclosure, the radiographic inspection device further includes an auxiliary shielding curtain mounted at a second opening of the inspection space connecting to the outside; and an auxiliary driving mechanism mounted on the support frame and configured to drive the auxiliary shielding curtain to move, so as to open or close the second opening.

According to an embodiment of the present disclosure, the radiographic inspection device further includes an auxiliary detection apparatus, where the auxiliary driving mechanism drives the auxiliary shielding curtain to rise, in response to the auxiliary detection apparatus detecting that the object carried on the transfer mechanism is located in the support frame and is getting close to the auxiliary shielding curtain, so as to allow the object on the transfer mechanism to move outside the inspection space.

According to an embodiment of the present disclosure, the radiographic inspection device further includes a fourth detection apparatus, where the driving mechanism drives the auxiliary shielding curtain to fall to an initial position, in response to the fourth detection apparatus detecting that the object carried on the transfer mechanism moves outside the support frame away from the auxiliary shielding curtain.

According to an embodiment of the present disclosure, the shielding curtain includes a stacked multilayer material, one layer of the stacked multilayer material is made of a material containing lead.

According to another embodiment of the present disclosure, a method of inspecting an object using the aforementioned radiographic inspection device includes:

placing an object to be inspected on the transfer mechanism;

driving, when the object to be inspected moves close to the first opening, the shielding curtain to rise by the driving mechanism, so as to allow the object to move into an interior of the inspection space;

driving, when the object on the transfer mechanism moves in the support frame away from the shielding curtain, the shielding curtain to fall to an initial position by the driving mechanism;

performing a radioactive inspection on the object moving within the inspection space;

driving the inspected object to move towards the first opening by the transfer mechanism; and driving, when the inspected object moves close to the first opening, the shielding curtain to rise by the driving mechanism, so as to allow the object to move outside the inspection space.

According to an embodiment of the present disclosure, the method further includes steps of:

driving, when the inspected object outside the support frame moves away from the shielding curtain, the shielding curtain to fall to the initial position by the driving mechanism.

According to another embodiment of the present disclosure, a method for inspecting an object using the aforementioned radiographic inspection device is provided, including:

placing an object to be inspected on the transfer mechanism;

driving, when the object to be inspected moves close to the first opening, the shielding curtain to rise by the driving mechanism, so as to allow the object on the transfer mechanism to move into an interior of the inspection space;

driving, when the object on the transfer mechanism moves in the support frame away from the shielding curtain, the shielding curtain to fall to an initial position by the driving mechanism;

performing a radioactive inspection on the object moving within the inspection space; and driving, when the inspected object within the inspection space moves close to the second opening, the auxiliary shielding curtain to rise by the auxiliary driving mechanism, so as to allow the object to move outside the inspection space.

According to an embodiment of the present disclosure, the method further includes steps of:

driving, when the object outside the support frame moves away from the auxiliary shielding curtain, the auxiliary shielding curtain to fall to the initial position by the second driving mechanism.

5

Figure 1:
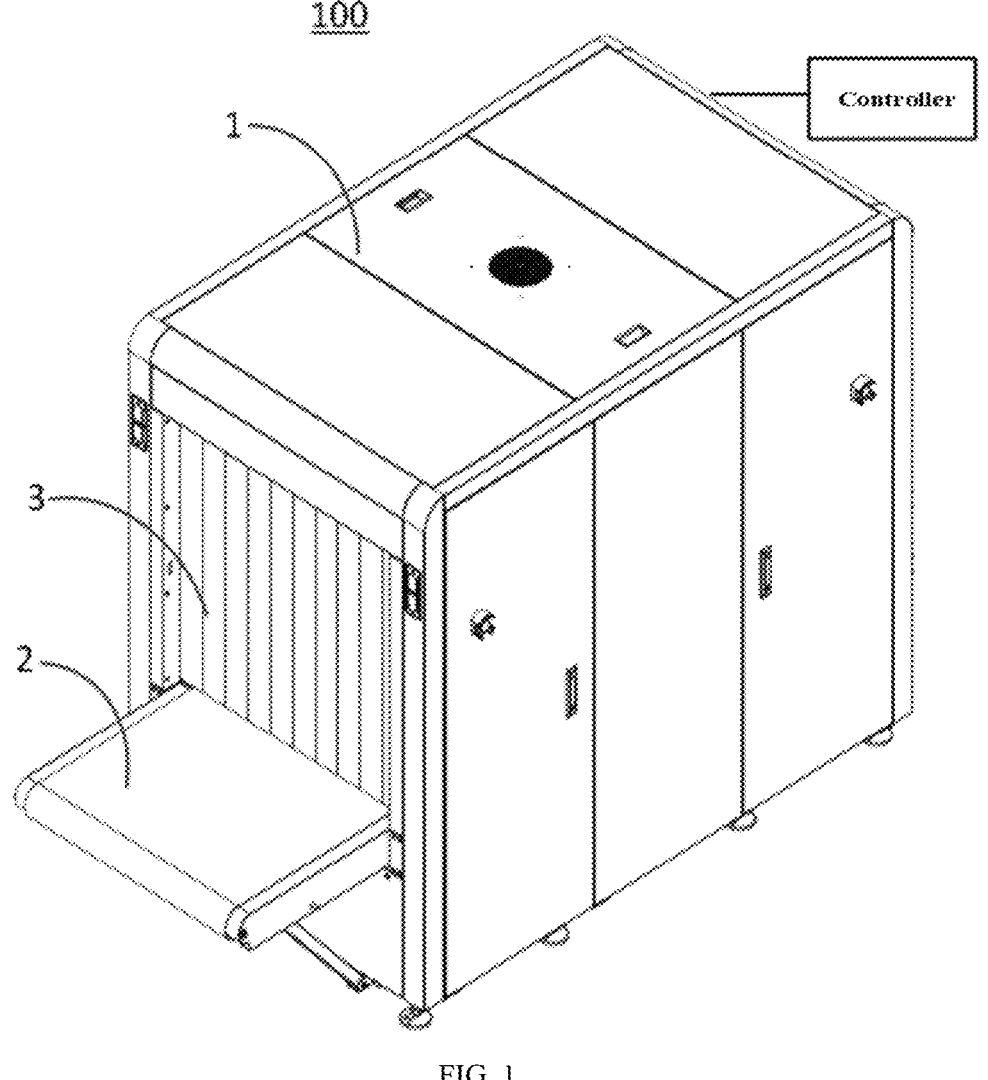
FIG. 1 shows a three-dimensional schematic diagram of a radiographic inspection device according to an exemplary embodiment of the present disclosure.
Figure 2:
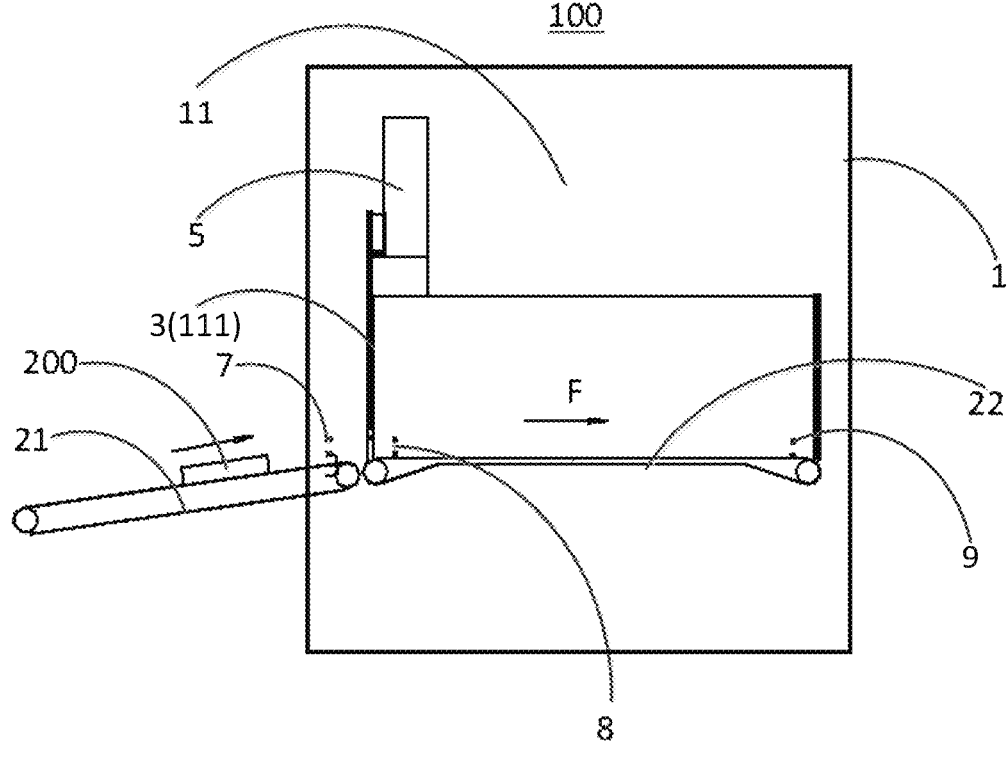
Figure 3:
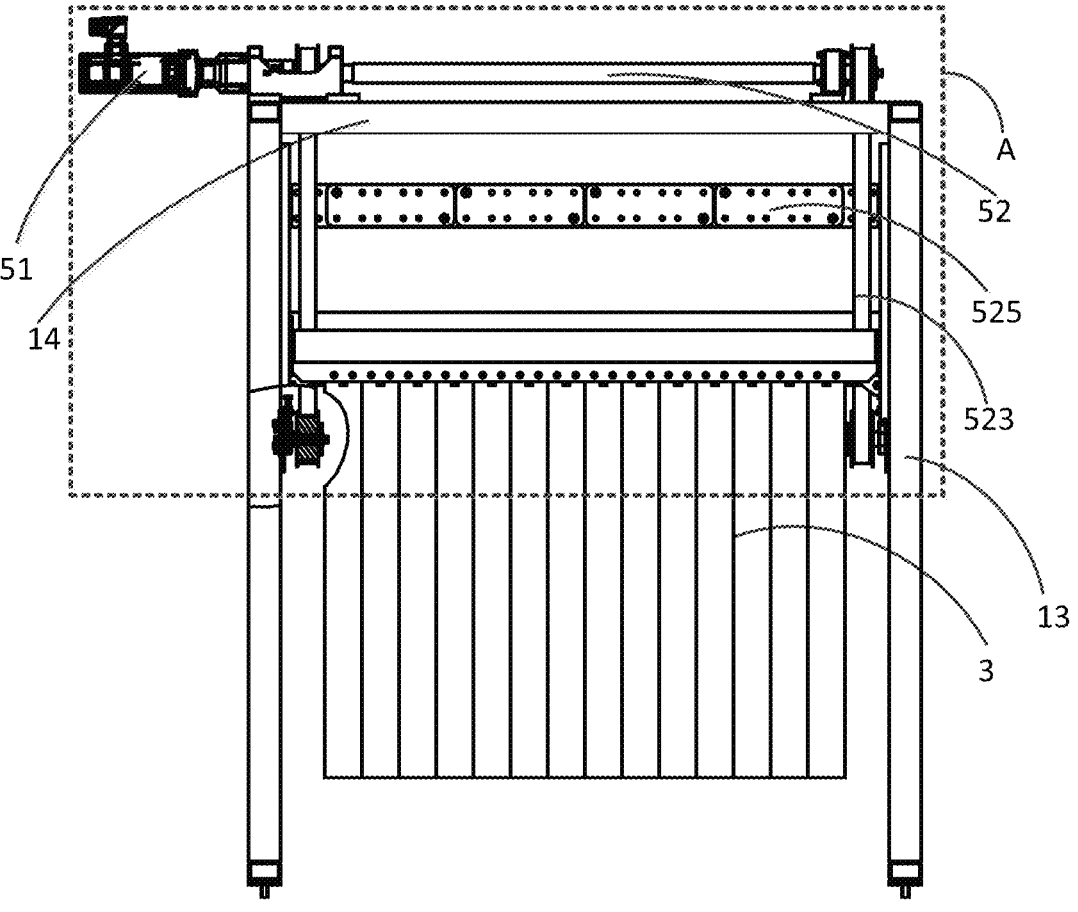
Figure 4:
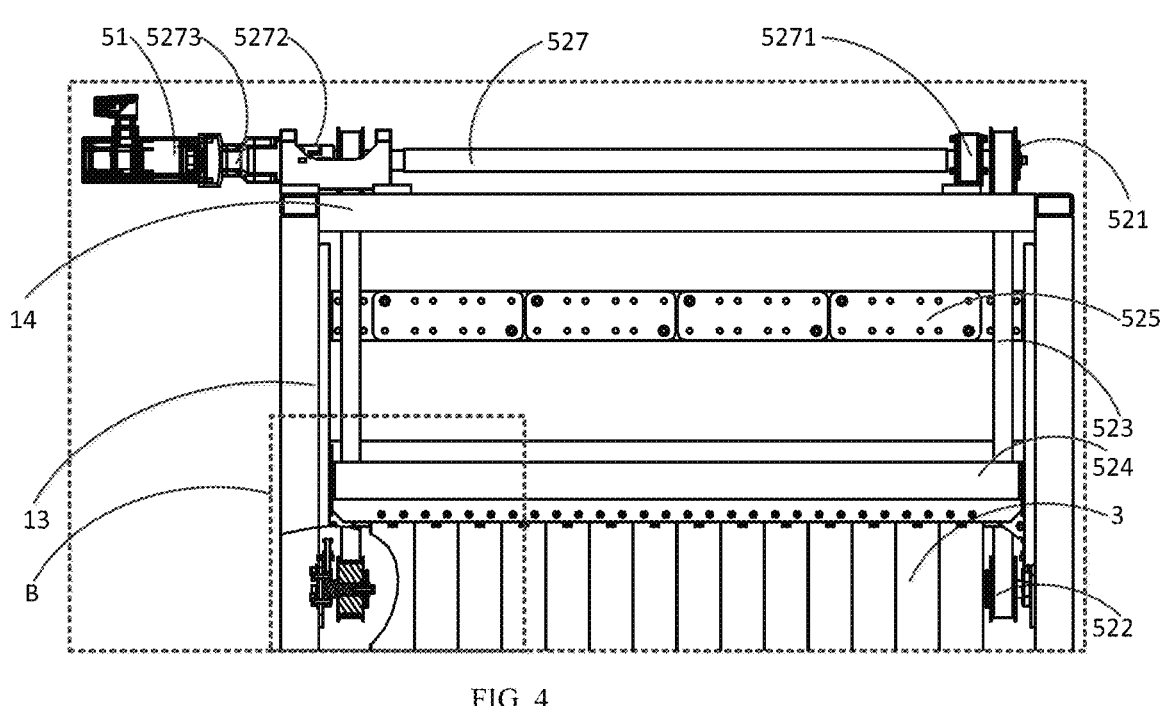
Figure 5:
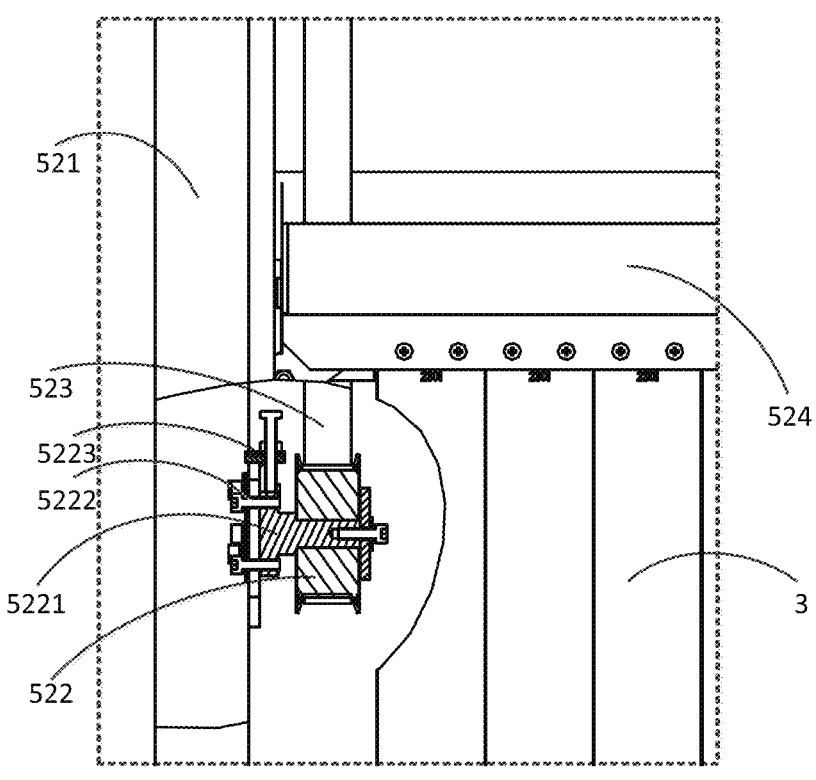
Figure 6:
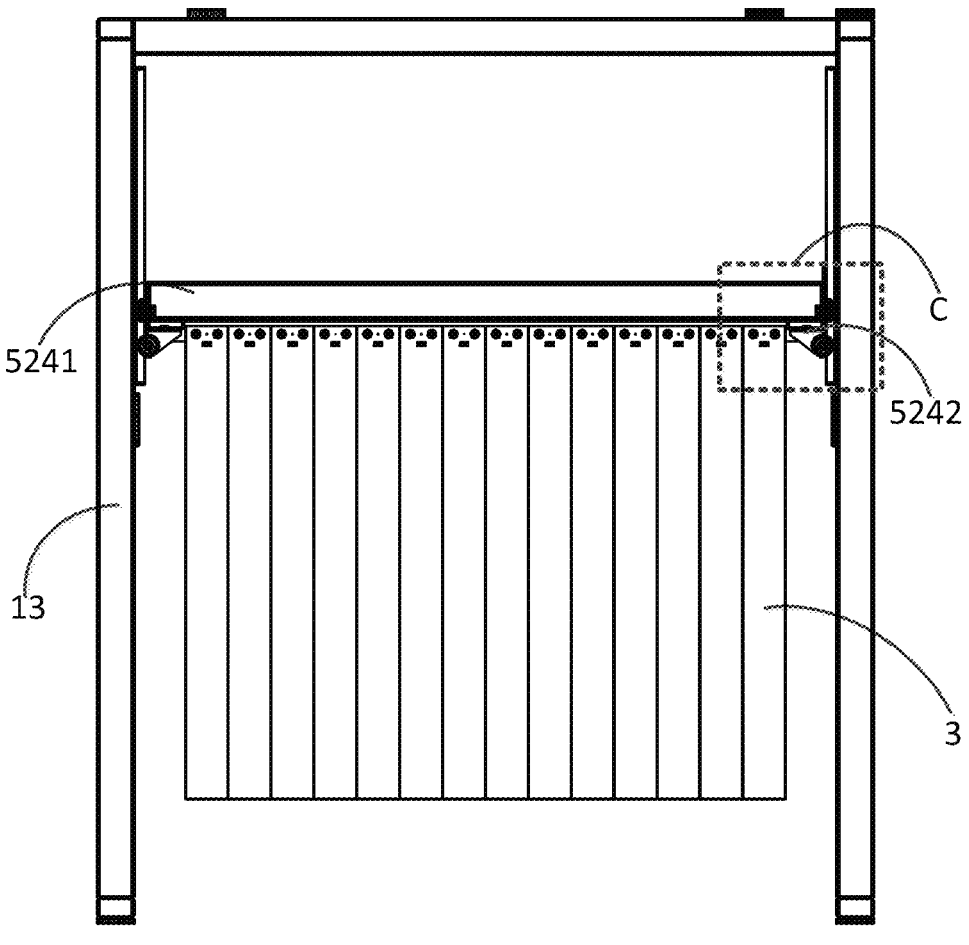
Figure 7:
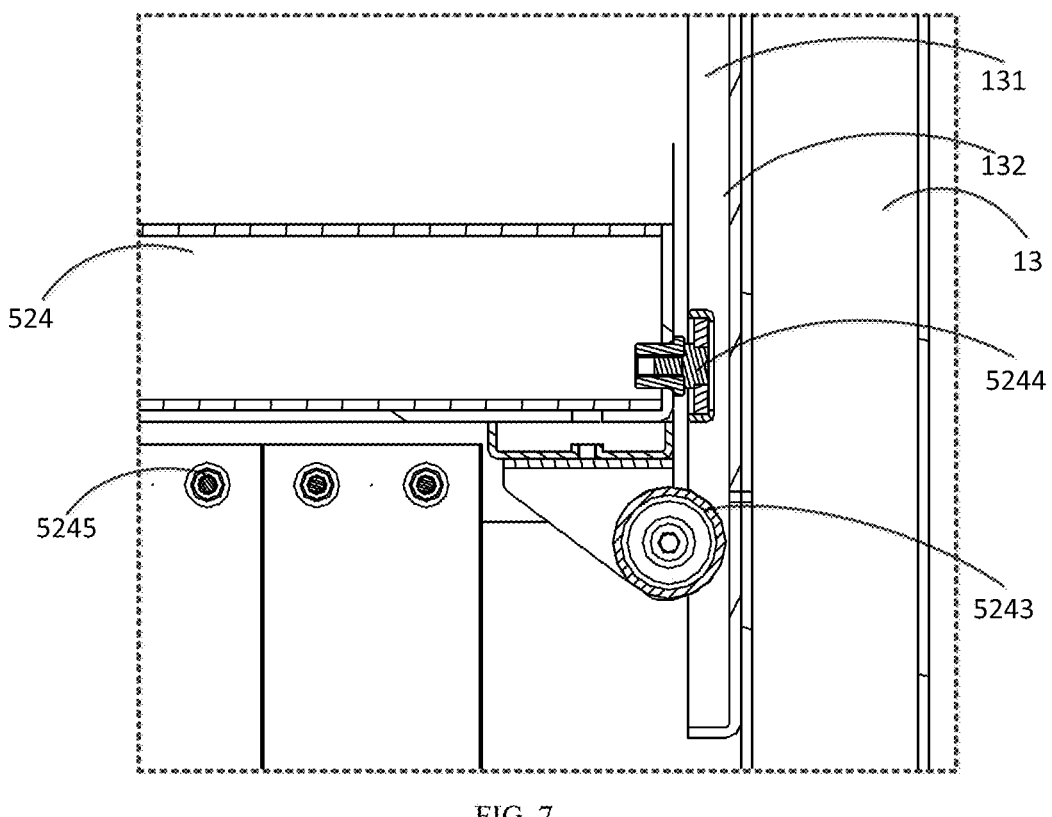
Figure 8:
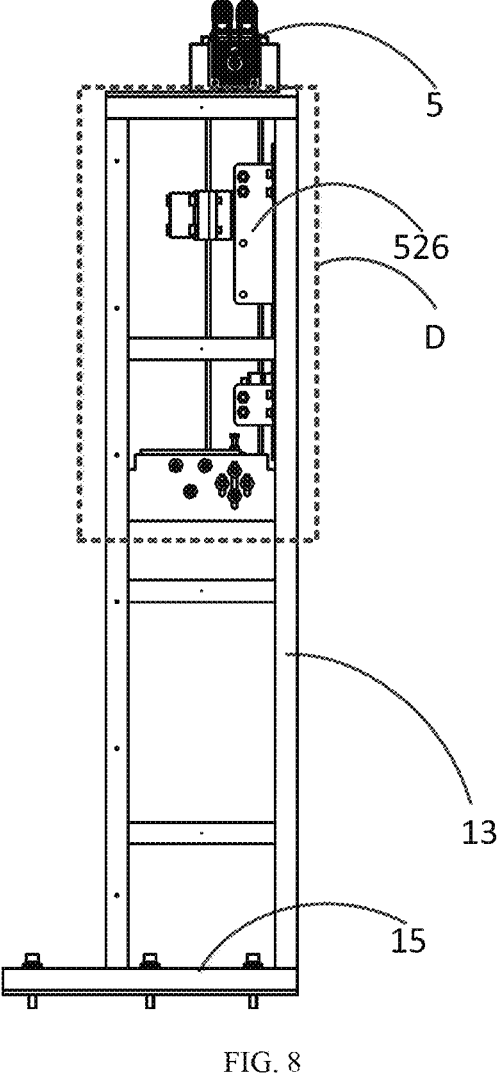
Figure 9:
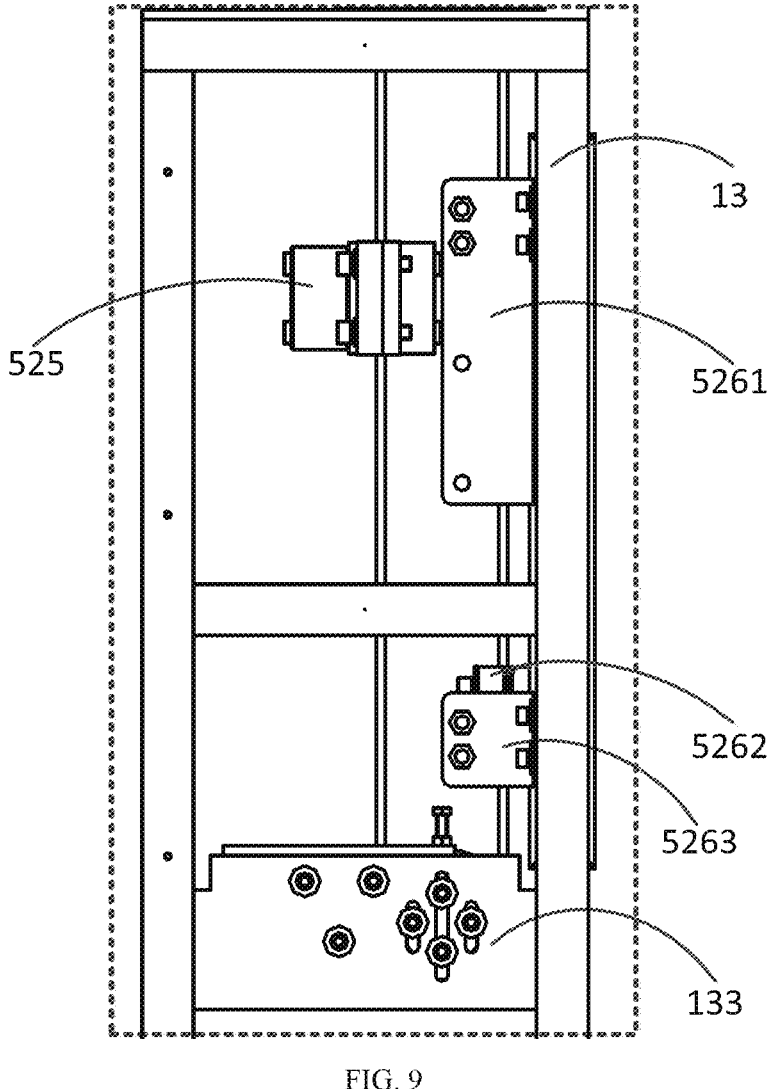
Figure 10:
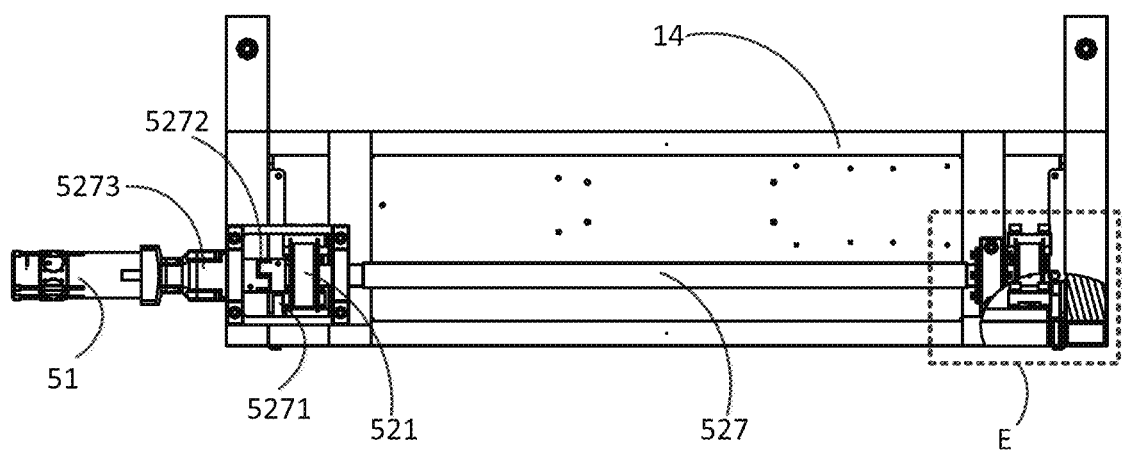
Figure 11:
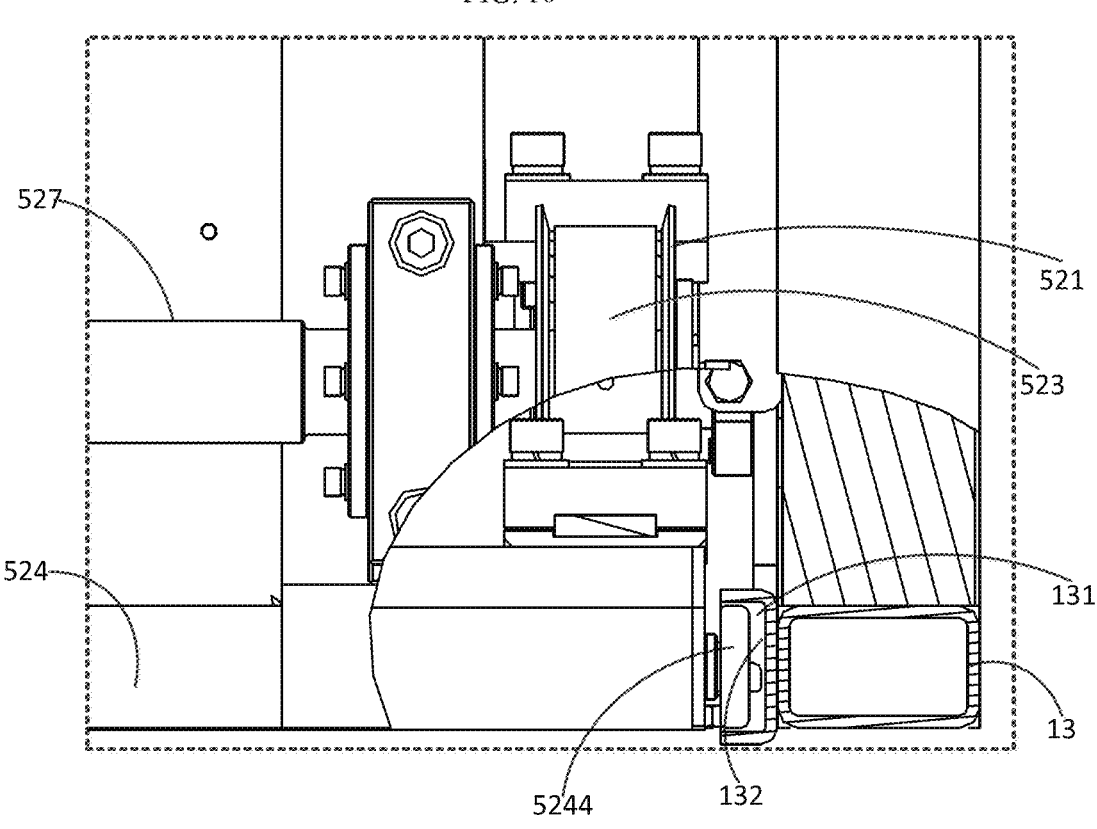
Figure 12:
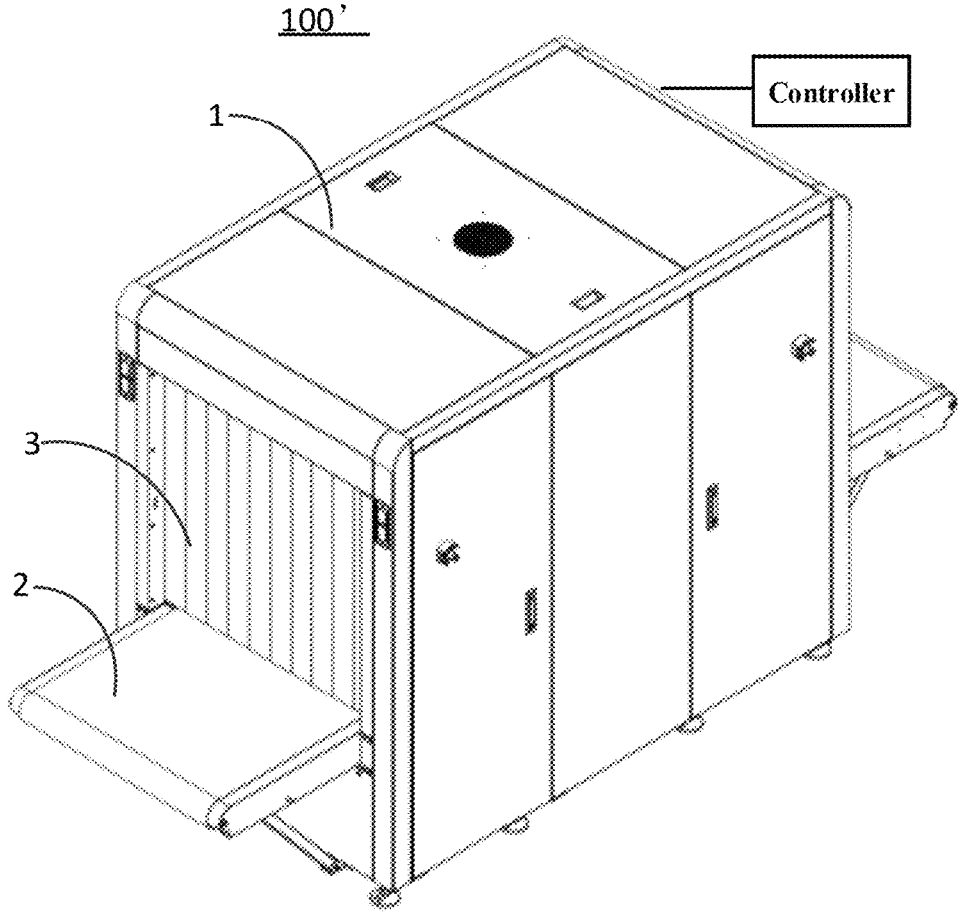
Figure 13:
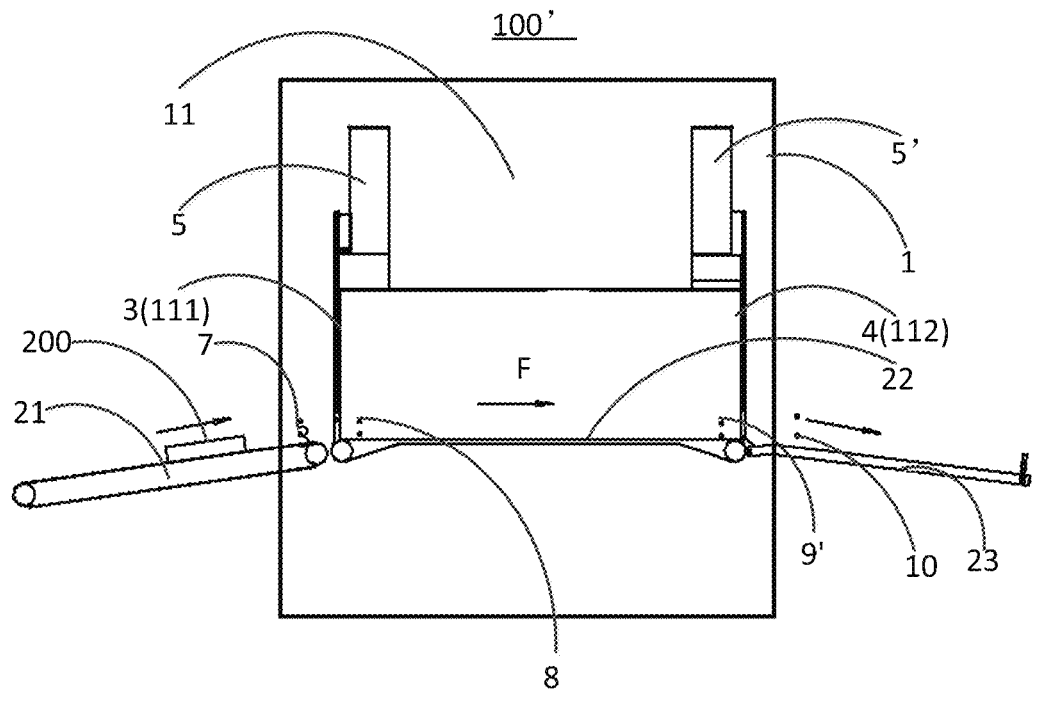

FIG. 2 shows a simplified schematic diagram of a process of inspecting an object by the radiographic inspection device shown in FIG. 1;

FIG. 3 shows a partial elevation view of the radiographic inspection device shown in FIG. 1;

FIG. 4 shows an enlarged schematic diagram of part A shown in FIG. 3;

FIG. 5 shows an enlarged schematic diagram of part B shown in FIG. 4;

FIG. 6 shows another partial elevation view of the radiographic inspection device shown in FIG. 1;

FIG. 7 shows an enlarged schematic diagram of part C shown in FIG. 6;

FIG. 8 shows a partial side view of the radiographic inspection device shown in FIG. 1;

FIG. 9 shows an enlarged schematic diagram of part D shown in FIG. 8;

FIG. 10 shows a partial top view of the radiographic inspection device shown in FIG. 1;

FIG. 11 shows an enlarged schematic diagram of part E shown in FIG. 10;

FIG. 12 shows a three-dimensional schematic diagram of a radiographic inspection device according to another exemplary embodiment of the present disclosure; and FIG. 13 shows a simplified schematic diagram of a process of inspecting an object by the radiographic inspection device shown in FIG. 12.

DETAILED DESCRIPTION OF EMBODIMENTS

With reference to accompanying drawings in embodiments of the present disclosure, the technical solution in the embodiments of the present disclosure will be described clearly and completely. Apparently, the embodiments described are only some embodiments of the present disclosure, rather than all embodiments. The description of at least one exemplary embodiment below is actually only explanatory, and it will never be used as any limitation on the present disclosure and its application or use. Based on embodiments in the present disclosure, all other embodiments derived by those of ordinary skill in the art without creative labor, fall within the scope of protection of the present disclosure.

In the following detailed descriptions, for purposes of explanation, many specific details are elaborated to provide a comprehensive understanding of embodiments of the present disclosure. However, it is clear that one or more embodiments may be implemented without these specific details. In other cases, well-known structures and devices are illustrated to simplify the accompanying drawings. It may not be discussed in details about technologies, methods and devices known by those of ordinary skill in the art in related fields, but in an appropriate case, the technologies, methods and devices should be regarded as a part of granted description.

In the description of the present disclosure, it should be understood that an orientation or position relationship indicated by words such as "front, back, up, down, left, right", "lateral, longitudinal, vertical, horizontal" and "top, bottom" and other positions, is just to facilitate the description of the present disclosure and simplify the description, based on the orientation or position relationship shown in the figures. Without an opposite explanation, these orientation words do not indicate and suggest devices or components referred to that must have a specific orientation or construction or operate in a specific orientation, so it should not be understood as a limitation on the scope of protection of the present disclosure. The orientation word "inner or outside" refers to an inside or an outside of a contour of each component itself.

In the description of the present disclosure, it should be understood that it is just to facilitate differences in corresponding parts, by using words "first" and "second" to define parts. If there is no other statements, the above words have no special meaning, which should not be understood as a limitation on the scope of protection of the present disclosure.

According to a general concept of an invention of the present disclosure, a radiographic inspection device is provided, including a support frame, where an inspection space applicable to inspect an object is formed within the support frame, and the inspection space has a first opening connecting to an outside; a transfer mechanism applicable to carry the object to move through the inspection space; a shielding curtain mounted at the first opening; and a driving mechanism. The driving mechanism includes a driver mounted on the support frame, and a joint portion, where an upper end of the shielding curtain is connected to the joint portion. The driver is configured to synchronously drive two ends of the joint portion, so that the shielding curtain moves up and down with the joint portion to open or close the first opening.

FIG. 1 shows a three-dimensional schematic diagram of a radiographic examination device according to an exemplary embodiment of the present disclosure. FIG. 2 shows a simplified schematic diagram of a process of inspecting an object by the radiographic inspection device shown in FIG. 1.

In an exemplary embodiment, as shown in FIGS. 1 to 2, the radiographic inspection device 100 is applicable to inspect whether a prohibited item such as a drug or an explosive exists in an object 200 (such as suitcases, packages, and handbags) or not, at places with high liquidity such as stations, airports, stadiums or shopping malls. The radiographic inspection device 100 includes: a support frame 1, a transfer mechanism 2, a shielding curtain 3 and a driving mechanism 5. An inspection space 11 applicable to inspect the object 200 is formed within the support frame 1. The inspection space 11 has a first opening 111 connecting to an outside. The support frame 1 is equipped with a housing made of shielding material to prevent radiation from leaking. The transfer mechanism 2 is applicable to carry the object 200 to move through the inspection space 11. An X-ray emitting and receiving apparatus such as a CT machine is mounted on the support frame to perform X-ray scanning on the object 200 transferred from the transfer mechanism 2 to the inspection space 11. The shielding curtain 3 is mounted at the first opening 111 of the inspection space 11. The driving mechanism 5 includes a driver 51 mounted on the support frame and a joint portion 524. An upper end of the shielding curtain 3 is connected to the joint portion 524. The driver 51 is configured to synchronously drive two ends of the joint portion, so that the shielding curtain 3 moves up and down with the joint portion 524 to open or close the first opening 111. The radiographic inspection device 100 also includes a controller applicable to receive electrical signals from various sensors and control operations of related devices (such as CT machines, driving mechanisms, etc.) of the radiographic inspection device.

The support frame 1 may include a plurality of upright frames 13 located on two sides of the support frame 1 and a plurality of top frames 14 located on an upper part of the upright frame 13. The upright frame 13 is mounted on base 15. The transfer mechanism 2 includes an input transfer mechanism 21 mounted outside the first opening 111 of the support frame 1, and an internal transfer mechanism 22 located in the inspection space 11. Each of the input transfer mechanism 21 and the internal transfer mechanism 22 may include a tape machine for cyclic rotation. The object 200 to be inspected is placed on the input transfer mechanism 21 and transferred from the input transfer mechanism 21 to the internal transfer mechanism 22. After being inspected in the inspection space 11, the object is transported by the internal transfer mechanism 22 to the input transfer mechanism 21, which is implemented as an output portion, to complete a process of scanning the object 200. That is to say, the object 200 in the transfer mechanism 2 enters the inspection space 11 through the first opening 111, and moves from a second opening 112 on the transfer mechanism 2 to an outside of the inspection space 11 after being scanned.

In this way, in the radiographic inspection device of the embodiments of the present disclosure, before the object 200 to be inspected passes the first opening 111, according to the object 200 being close to the first opening 111, the shielding curtain 3 may be lifted by the driving mechanism 5, so as to allow the object 200 to smoothly pass through the first opening 111. After the object passes through the first opening 111, according to the object moving away from the first opening, the driving mechanism 5 will drive the shielding curtain 3 to fall, so as to prevent X-rays in the inspection space from leaking outside, which causes radiation pollution to surrounding environments.

FIG. 3 shows a partial elevation view of the radiographic inspection device shown in FIG. 1. FIG. 4 shows an enlarged schematic diagram of part A shown in FIG. 3. FIG. 5 shows an enlarged schematic diagram of part B shown in FIG. 4; FIG. 6 shows another partial elevation view of the radiographic inspection device shown in FIG. 1. FIG. 7 shows an enlarged schematic diagram of part C shown in FIG. 6. FIG. 8 shows a partial side view of the radiographic inspection device shown in FIG. 1. FIG. 9 shows an enlarged schematic diagram of part D shown in FIG. 8. FIG. 10 shows a partial top view of the radiographic inspection device shown in FIG. 1. FIG. 11 shows an enlarged schematic diagram of part E shown in FIG. 10.

In an exemplary embodiment, with reference to FIGS. 3 to 11, the driving mechanism further includes a transmission mechanism 52. The driver 51 drives the joint portion 524 to rise and fall through the transmission mechanism 52, so as to drive the shielding curtain 3 to rise or fall, thereby opening or closing the first opening 111.

In an exemplary embodiment, with reference to FIGS. 3 to 11, the driver 51 includes a motor applicable to drive the transmission mechanism 52. The transmission mechanism includes a driven shaft 525, two first rollers 521, two second rollers 522 and conveyor belts 523. The driven shaft 525 is disposed on an upper part of the top frame 14 of the support frame 1, and is driven to rotate by the motor through a reduction mechanism 5273 and a coupling 5272. The two first rollers 521 are respectively mounted near two ends of the driven shaft 525, so as to rotate with the driven shaft 525. Each first roller is mounted on the upper part of the top frame 14 of the support frame 1 through a bearing mechanism 5271. Two second rollers 522 are respectively mounted on the upright frame 13 of the support frame 1 and respectively located below the two first rollers 521. Two conveyor belts 523 are each wrapped around one of the two first rollers 521 and one of the two second rollers 522, so as to form two groups of conveyor belt mechanisms. Two ends of the joint portion 524 are respectively connected to the two conveyor belts 523, and the shielding curtain 3 is connected to the joint portion 524, so that the shielding curtain 3 is driven to move up and down with the conveyor belt 523.

In an exemplary embodiment, with reference to FIGS. 4 to 5 and 8 to 9, each second roller 522 is rotatably mounted on a fixed shaft 5221, which is mounted on a support base 133 located between the upright frames 13 using connecting components 5222 such as bolts. A height of the fixed shaft 5222 relative to the upright frame 13 may be adjusted by an adjusting bolt 5223, so as to adjust a tension of the conveyor belt.

In an exemplary embodiment, with reference to FIGS. 3 to 11, the joint portion 524 includes a main body portion 5241 having a shape of strip. The upper end of the shielding curtain 3 is connected to the main body portion 5241 through a plurality of connecting components 5245 such as bolts. Two guide mechanisms 5242 are respectively disposed at two ends of the main body portion 5241. Each guide mechanism 5242 is applicable to fit with the upright frame 13 to guide the joint portion 524 to move up and down along the upright frame 13. In this way, the driver 51 drives two first rollers 521 to rotate through the driven shaft 525, so as to further drive the conveyor belt 523 to move up and down, thereby driving the upper end of the shielding curtain 3 to move up and down.

Although an embodiment of the transmission mechanism including the first rollers, the second rollers and the conveyor belts are described above, the present disclosure is not limited to this. In an alternative embodiment, the transmission mechanism may include a turbine driven by a motor and a worm which matches with the turbine. The joint portion is mounted on the worm. In this way, the motor drives the turbine to rotate, and through a meshing between the turbine and the worm, a rotation of the motor is converted into a linear movement of the worm, thereby causing the worm to drive the shielding curtain to rise and fall. In another alternative embodiment, a piston rod of a pneumatic cylinder or a hydraulic cylinder may be used to drive the joint portion to reciprocate straight up and down, thereby driving the shielding curtain to rise and fall.

In an exemplary embodiment, each guide mechanism 5242 includes a first pulley apparatus 5244. The first pulley apparatus 5244 is disposed at two ends of the main body portion 5241 and extends into a guide groove 131 formed in the upright frame 13, so as to rotate by abutting against a side wall of the guide groove 131. The guide groove 131 extends in an upright direction on the upright frame 13. In this way, the shielding curtain 3 may be prevented from swinging back and forth.

In an alternative exemplary embodiment, each guide mechanism includes a sliding block. The sliding block is disposed at two ends of the main body portion 5241 and slidably extending into a guide groove 131 formed in the upright frame 13. The guide groove extends in an upright direction on the upright frame.

In an exemplary embodiment, with reference to FIGS. 3 to 11, the guide structure 5242 further includes a second pulley apparatus 5243. The second pulley apparatus 5243 is mounted on a lower side of two ends of the main body portion 5241. Pulleys of the second pulley apparatus 5243 are rotatably in contact with a bottom 132 of the guide groove 131. In this may, the shielding curtain 3 may be prevented from swinging left and right, and the shielding curtain 3 may be maintain to move up and down in a stable posture.

In an exemplary embodiment, the transmission mechanism 52 further includes a counterweight 525. A weight of the counterweight 525 depends on a total weight of the joint portion 4 and the shielding curtain 3. The counterweight 525 is connected between the two conveyor belts 523 and located on the other side opposite to one side connecting to the joint portion 524, so as to balance a weight of the joint portion 524 and a weight of the shielding curtain 3. By disposing the counterweight 525, a force driving a movement of the shielding curtain may be reduced, thereby reducing a power of the driver.

In an exemplary embodiment, with reference to FIGS. 3 to 8, the radiographic inspection device 100 further includes a limiting apparatus 526. The limiting apparatus 526 is applicable to limit a range of movement of the joint portion 524 in an up and down direction, thereby limiting a lifting range of the shielding curtain 3. Specifically, the limiting apparatus 526 includes a first proximity switch 5261 mounted on the upright frame 13 of the support frame 1, and a matching switch 5262 mounted on the joint portion 524. The driving mechanism 5 stops driving the shielding curtain 3 to rise in response to the matching switch 5262 being close to the first proximity switch 5261. Furthermore, the limiting apparatus 528 also includes a second proximity switch 5263 mounted on the upright frame 13 of the support frame 1 and located below the first proximity switch 5261. The driving mechanism 5 stops driving the shielding curtain 3 to fall in response to the matching switch 5262 being close to the second proximity switch 5263. That is to say, when the matching switch 5262 is close to the first proximity switch 5261, the shielding curtain 3 is stopped rising. When the matching switch 5262 is close to the second proximity switch 5263, the shielding curtain 3 is stopped falling. In this way, the range of movement of the upper end of the shielding curtain 3 is limited into a distance between the first proximity switch 5261 and the second proximity switch 5263. That is to say, a maximum lifting range of the shielding curtain 3 is the distance between the first proximity switch 5261 and the second proximity switch 5263.

In an exemplary embodiment, the first proximity switch 5261 and the second proximity switch 5263 are electromagnetically coupled with the matching switch 5262 through an inductive induction. For example, each of the first proximity switch 5261 and the second proximity switch 5263 includes a transmitting coil. The matching switch 5262 includes a receiving coil electromagnetically coupled with the transmitting coil. In an alternative embodiment, the first proximity switch 5261 and the second proximity switch 5263 are electrically connected to the matching switch 5262 through an electrical contact manner.

In an exemplary embodiment, with reference to FIGS. 1 to 2, the radiographic inspection device 100 further includes a first detection apparatus 7. The driving mechanism 5 drives the shielding curtain to rise, in response to the first detection apparatus 7 detecting that the object 200 carried on an input transfer mechanism 21 of the transfer mechanism 2 is located on an outer side of the support frame 1 and is getting close to the shielding curtain 3 located at the first opening 11 in a movement direction F. The shielding curtain is in an open state, so as to allow the object 200 on the transfer mechanism 2 to move into an interior of the inspection space 11.

In an exemplary embodiment, with reference to FIGS. 1 to 2, the radiographic inspection device 100 further includes a second detection apparatus 8. The driving mechanism 5 drives the shielding curtain 3 to fall to an initial position, in response to the second detection apparatus 8 detecting that the object 200 carried on an internal transfer mechanism 22 of the transfer mechanism 2 moves in the support frame 1 away from the shielding curtain 3 located at the first opening 111. The shielding curtain is in a closed state, so as to prevent radiation from leaking.

In an exemplary embodiment, with reference to FIGS. 1 to 2, the radiographic inspection device 100 further includes a third detection apparatus 9. The transfer mechanism 2 drives the object 200 to move towards the first opening 111 in a reversing direction relative to the movement direction F, in response to the third detection apparatus 9 detecting the inspected object 200 carried on the internal transfer mechanism 22 of the transfer mechanism 2.

In an exemplary embodiment, with reference to FIGS. 1 to 2, the driving mechanism 5 drives the shielding curtain 3 to rise, in response to the transfer mechanism 2 rotating in the reversing direction and the second detection apparatus 8 detecting that the inspected object 200 carried on the transfer mechanism 2 is in the support frame 1 and is getting close to the shielding curtain 3, so as to allow the object 200 on the transfer mechanism 2 to move outside the inspection space 11.

According to another embodiment of the present disclosure, a method of inspecting an object 200 using the radiographic inspection device 100 described in any of the above embodiments is provided, with reference to FIGS. 1 and 2, including the following steps.

An object 200 to be inspected is placed on the input transfer mechanism 21 of the transfer mechanism, so that the transfer mechanism drives the object 200 to move in a movement direction F.

When the object 200 to be inspected moves close to the first opening 111, the shielding curtain 3 is driven to rise by the driving mechanism 5, so as to allow the object 200 to move along the movement direction F on an input transfer mechanism 21 of the transfer mechanism 2 into an interior of the inspection space 11 to an internal transfer mechanism 22 inside the inspection space 11.

When the object 200 on the internal transfer mechanism 22 of the transfer mechanism 2 moves in the support frame 1 away from the shielding curtain 3, the shielding curtain 3 is driven to fall to an initial position by the driving mechanism 5, where the initial position is a position of which a lower end of the shielding curtain 3 is in contact with the transfer mechanism 2.

A radioactive inspection is performed on the object moving within the internal transfer mechanism of the transfer mechanism 2 within the inspection space.

The transmission mechanism 2 rotates in a reversing direction relative to the movement direction to drive the inspected object 200 to move towards the first opening 111.

When the inspected object 200 moves close to the first opening 111, the shielding curtain 3 is driven to rise by the driving mechanism 5, so as to allow the object 200 to move outside the inspection space 11.

Furthermore, in a case that the transfer mechanism rotates in the reversing direction of the movement direction, when the inspected object 200 moves away from the shielding curtain 3 outside the support frame 1, the shielding curtain 3 is driven to fall to the initial position by the driving mechanism.

It may be understood that in the radiographic inspection device 100 shown in FIGS. 1 and 2, the first opening 111 is implemented as an entrance for the object 200 to enter the inspection space 11 and an exit for the object 200 to move away from the inspection space 11 after the inspection is completed.

FIG. 12 shows a three-dimensional schematic diagram of a radiographic inspection device according to another exemplary embodiment of the present disclosure. FIG. 13 shows a simplified schematic diagram of a process of inspecting an object by the radiographic inspection device shown in FIG. 12.

A difference between the radiographic inspection device 100' of the embodiments shown in FIGS. 12 and 13 and the radiographic inspection device 100 shown in FIGS. 1 and 2 is, based on the radiographic inspection device 100, the radiographic inspection device 100' also includes an auxiliary shielding curtain 4 and an auxiliary driving mechanism 5'. The auxiliary shielding curtain 4 is mounted at a second opening 112 of the inspection space 11 connecting to an outside. The auxiliary driving mechanism 5' is mounted on the support frame 1 and is configured to drive the auxiliary shielding curtain 4 to move, so as to open or close the second opening 112, and allow the object 200 to pass through the second opening 112 on the transfer mechanism 2 and move outside the inspection space 11.

In an exemplary embodiment, with reference to FIGS. 12 to 13, the radiographic inspection device 100' further includes an auxiliary detection apparatus 9'. The auxiliary shielding curtain 4 located at the second opening 112 is driven to rise by the auxiliary driving mechanism 5', in response to the auxiliary detection apparatus detecting that the object 200 carried on the transfer mechanism 2 is located in the support frame 1 and is getting close to the auxiliary shielding curtain 4 located at the second opening 112, so as to allow the object 200 on the transfer mechanism 2 to move outside the inspection space 11. Correspondingly, the transfer mechanism 2 also includes an output transfer mechanism 23 mounted outside the inspection space 11, so as to receive the inspected object 200 transmitted from an internal transfer mechanism 22.

In an exemplary embodiment, with reference to FIGS. 9 to 10, the radiographic inspection device 100' further includes a fourth detection apparatus 10. The auxiliary driving mechanism 5' drives the auxiliary shielding curtain 4 to fall to an initial position, in response to the fourth detection apparatus 10 detecting that the object 200 carried on the internal transfer mechanism 22 of the transfer mechanism 2 moves outside the support frame 1 away from the auxiliary shielding curtain 4. The auxiliary shielding curtain 4 or the second opening 112 is in a closed state, so as to prevent radiation from leaking.

Although the embodiments of the driving mechanism 5 driving the rising and falling of the shielding curtain 3 at the first opening 111 are described above, those of ordinary skill in the art may understand that the auxiliary driving mechanism 5' with the same or similar structure may drive the rising and falling of the auxiliary shielding curtain 4 at the second opening 112, and the driver and the transmission mechanism applicable to the shielding curtain 3 may be the same or similar to the driver and the transmission mechanism applicable to the auxiliary shielding curtain 4. In an alternative exemplary embodiment, one driver may selectively drive the shielding curtain 3 and the auxiliary shielding curtain 4 through a clutch.

In an exemplary embodiment, with reference to FIGS. 3 to 13, the driving mechanism 5 and the auxiliary driving mechanism 5' are applicable to respectively drive the shielding curtain 3 and the auxiliary shielding curtain 4 to rise or fall. Either of the driving mechanism 5 and the auxiliary driving mechanism 5' includes: a driver 51 mounted on the support frame 1, and a transmission mechanism 52. The driver 51 drives one of the two shielding curtains 3 and 4 to rise or fall through the transmission mechanism 52, so as to open or close the entrance or the exit.

In an exemplary embodiment, the first detection apparatus 7, the second detection apparatus 8, the third detection apparatus 9, the auxiliary detection apparatus 9' and the fourth detection apparatus 10 include: light emitting components and light receiving components mounted on two sides of the support frame 1 perpendicular to a movement direction F of the object 200, and the light receiving components are applicable to receive the light emitted by the light emitting devices. When the object 200 moves to block beams emitted by the light emitting components, the beams received by the light receiving components decrease or even no beam reaches the light receiving components, thereby detecting that the object 200 moves to a predetermined position. The controller controls the driving mechanism to drive the shielding curtain to rise, fall, or maintain in an original state based on electrical signals generated by optical receiving components indicating that the object has reached the predetermined position.

In an exemplary embodiment, with reference to FIGS. 7 to 8, the shielding curtain 3 or the auxiliary shielding curtain 4 includes a stacked multilayer material, one layer of the stacked multilayer material is made of a material containing lead. For example, each shielding curtain may be represented as a single panel with an external contour, so as to improve a performance of shielding X-ray of the shielding curtain.

According to another embodiment of the present disclosure, a method of inspecting an object 200 using the radiographic inspection device 100' described in any of the above embodiments is provided, with reference to FIGS. 12 and 13, including the following steps.

An object 200 to be inspected is placed on the input transfer mechanism 21 of the transfer mechanism 2, so that the transfer mechanism drives the object 200 to move in a movement direction F.

When the object 200 to be inspected moves close to the first opening 111, the shielding curtain 3 is driven to rise by the driving mechanism 5, so as to allow the object 200 on an input transfer mechanism 21 of the transfer mechanism 2 to move to the internal transfer mechanism 22 inside the inspection space 11 along the movement direction F.

When the object 200 on the internal transfer mechanism 22 of the transfer mechanism 2 moves in the support frame 11 away from the shielding curtain 3, the shielding curtain 3 is driven to fall to an initial position by the driving mechanism 5, where the initial position is a position of which a lower end of the shielding curtain 3 is in contact with the transfer mechanism 2.

A radioactive inspection is performed on the object 200 moving within the internal transfer mechanism of the transfer mechanism 2 within the inspection space 11.

When the inspected object 200 within the inspection space 11 moves close to the second opening 112, the auxiliary shielding curtain 4 is driven to rise by the auxiliary driving mechanism 5', so as to allow the object 200 on the internal transfer mechanism of the transfer mechanism 2 to continue to move to an external output transfer mechanism 23 of the inspection space 11 along the movement direction F.

Furthermore, when the object on the output transfer mechanism 23 of the transfer mechanism 2 outside the support frame 1 moves away from the auxiliary shielding curtain 4, the auxiliary shielding curtain 4 is driven to fall to the initial position by the auxiliary driving mechanism 5', where the initial position is a position of which the lower end of the auxiliary shielding curtain 4 is in contact with the transfer mechanism 2.

It may be understood that the first detection apparatus 7, the second detection apparatus 8, the third detection apparatus 9, the auxiliary detection apparatus 9', and the fourth detection apparatus 10 respectively detect that the object 200 reaches different predetermined positions, that is, close to the first opening 111, away from the first opening 111, close to the second opening 112, and away from the second opening 112.

According to the aforementioned embodiments of the present disclosure, the radiographic inspection device may drive the rising and falling of the shielding curtain by the driving mechanism based on an occurrence of the object getting close to or moving away from the shielding curtain. It is possible to ensure that lightweight objects may smoothly enter the inspection space for subsequent radiographic scanning. While inspecting the object, it is possible to achieve stricter shielding of X-rays in the inspection space, so as to ensure that the rays are not leaked into the surrounding environments. Furthermore, in order to achieve tighter shielding, even if the shielding curtain is made heavier with a good rigidity and includes a support plate with greater rigidity, it may avoid a case that the shielding curtain may not be opened by the object during the security inspection process, much less a possibility of leaking of X-rays.

It may be understood by those of ordinary skill in the art that the above-described embodiments are exemplary, and those of ordinary skilled in the art may improve them. The structures described in various embodiments may be combined freely in terms of structures or principles not conflicting with each other.

Although the present disclosure has been described with reference to accompanying drawings, embodiments disclosed in the accompanying drawings are intended to illustrate optional embodiments of the present disclosure, and should not be construed as a limitation of the present disclosure. Although embodiments of the present disclosure have been illustrated and described, it may be understood by those of ordinary skill in the art that these embodiments may be changed without departing from the principle and spirit of the present disclosure. The scope of the present disclosure is defined by the appended claims and their equivalents.

What is claimed is:

1. A radiographic inspection device, comprising:
a support frame, wherein an inspection space applicable to inspect an object is formed within the support frame, and the inspection space has a first opening connecting to an outside;
a transfer mechanism applicable to carry the object to move through the inspection space;
a shielding curtain mounted at the first opening; and
a driving mechanism, comprising:
    a driver mounted on the support frame; and
    a joint portion, wherein an upper end of the shielding curtain is connected to the joint portion,
wherein the driver is configured to synchronously drive two ends of the joint portion, so that the shielding curtain moves up and down with the joint portion to open or close the first opening,
wherein the driving mechanism further comprises a transmission mechanism, wherein the driver drives the joint portion to rise or fall through the transmission mechanism,
wherein the driver comprises a motor,
the transmission mechanism comprises:
    a driven shaft mounted on an upper part of the support frame and driven to rotate by the motor;

two first rollers respectively mounted near two ends of the driven shaft and configured to rotate with the driven shaft;
    two second rollers respectively mounted on two opposite upright frames of the support frame, and respectively located below the two first rollers; and
    two conveyor belts each wrapped around one of the two first rollers and one of the two second rollers, wherein two ends of the joint portion are respectively connected to the two conveyor belts.

2. The radiographic inspection device of claim 1, wherein the joint portion comprises:
a main body portion having a shape of strip, wherein the upper end of the shielding curtain is connected to the main body portion; and
two guide mechanisms respectively disposed at two ends of the main body portion, wherein each guide mechanism is applicable to fit with the upright frame to guide the joint portion to move up and down along the upright frame.

3. The radiographic inspection device of claim 2, wherein each guide mechanism comprises:
a first pulley apparatus disposed at two ends of the main body portion and extending into a guide groove formed in the upright frame, so as to rotate by abutting against a side wall of the guide groove, wherein the guide groove extends in an upright direction on the upright frame.

4. The radiographic inspection device of claim 3, wherein the guide structure further comprises:
a second pulley apparatus mounted on a lower side of two ends of the main body portion, wherein pulleys of the second pulley apparatus are rotatably in contact with a bottom of the guide groove.

5. The radiographic inspection device of claim 2, wherein each guide mechanism further comprises:
a sliding block disposed at two ends of the main body portion and slidably extending into a guide groove formed in the upright frame, wherein the guide groove extends in an upright direction on the upright frame.

6. The radiographic inspection device of claim 1, wherein the transmission mechanism further comprises a counterweight, wherein the counterweight is connected between the two conveyor belts, so as to balance a weight of the joint portion and a weight of the shielding curtain.

7. The radiographic inspection device of claim 1, wherein the transmission mechanism further comprises a limiting apparatus applicable to limit a range of movement of the joint portion in the upright direction.

8. The radiographic inspection device of claim 7, wherein the limiting apparatus comprises:
a first proximity switch mounted on the support frame; and
a matching switch mounted on the joint portion, wherein the driving mechanism stops driving the shielding curtain to rise in response to the matching switch being close to the first proximity switch.

9. The radiographic inspection device of claim 8, wherein the limiting apparatus comprises:
a second proximity switch mounted on the support frame, wherein the driving mechanism stops driving the shielding curtain to fall in response to the matching switch being close to the second proximity switch.

10. The radiographic inspection device of claim 1, further comprising a first detection apparatus, wherein the driving mechanism drives the shielding curtain to rise, in response to the first detection apparatus detecting that the object carried on the transfer mechanism is located on an outer side of the support frame and is getting close to the shielding curtain, so as to allow the object on the transfer mechanism to move into an interior of the inspection space.

11. The radiographic inspection device of claim 1, further comprising a second detection apparatus, wherein the driving mechanism drives the shielding curtain to fall to an initial position, in response to the second detection apparatus detecting that the object carried on the transfer mechanism moves in the support frame away from the shielding curtain.

12. The radiographic inspection device of claim 11, further comprising a third detection apparatus, wherein the transfer mechanism rotates in a reversing direction to drive the object to move towards the first opening, in response to the third detection apparatus detecting the object carried on the transfer mechanism.

13. The radiographic inspection device of claim 12, wherein the driving mechanism drives the shielding curtain to rise, in response to the transfer mechanism rotating in the reversing direction and the second detection apparatus detecting that the object carried on the transfer mechanism is in the support frame and is getting close to the shielding curtain, so as to allow the object on the transfer mechanism to move outside the inspection space.

14. The radiographic inspection device of claim 1, further comprising:

an auxiliary shielding curtain mounted at a second opening of the inspection space connecting to the outside; and an auxiliary driving mechanism mounted on the support frame and configured to drive the auxiliary shielding curtain to move, so as to open or close the second opening.

15. The radiographic inspection device of claim 14, further comprising an auxiliary detection apparatus, wherein the auxiliary driving mechanism drives the auxiliary shielding curtain to rise, in response to the auxiliary detection apparatus detecting that the object carried on the transfer mechanism is located in the support frame and is getting close to the auxiliary shielding curtain, so as to allow the object on the transfer mechanism to move outside the inspection space.

16. The radiographic inspection device of claim 15, further comprising a fourth detection apparatus, wherein the driving mechanism drives the auxiliary shielding curtain to fall to an initial position, in response to the fourth detection apparatus detecting that the object carried on the transfer mechanism moves outside the support frame away from the auxiliary shielding curtain, wherein the shielding curtain comprises a stacked multi-layer material, one layer of the stacked multilayer material is made of a material containing lead.

17. A method of inspecting an object using the radiographic inspection device of claim 15, comprising:

placing an object to be inspected on the transfer mechanism;

driving, when the object to be inspected moves close to the first opening, the shielding curtain to rise by the driving mechanism, so as to allow the object on the transfer mechanism to move into an interior of the inspection space;

driving, when the object on the transfer mechanism moves in the support frame away from the shielding curtain, the shielding curtain to fall to an initial position by the driving mechanism;

performing a radioactive inspection on the object moving within the inspection space; and driving, when the inspected object within the inspection space moves close to the second opening, the auxiliary shielding curtain to rise by the auxiliary driving mechanism, so as to allow the object to move outside the inspection space.

18. A method of inspecting an object using the radiographic inspection device of claim 1, comprising:

placing an object to be inspected on the transfer mechanism;

driving, when the object to be inspected moves close to the first opening, the shielding curtain to rise by the driving mechanism, so as to allow the object to move into an interior of the inspection space;

driving, when the object on the transfer mechanism moves in the support frame away from the shielding curtain, the shielding curtain to fall to an initial position by the driving mechanism;

performing a radioactive inspection on the object moving within the inspection space;

driving the inspected object to move towards the first opening by the transfer mechanism; and driving, when the inspected object moves close to the first opening, the shielding curtain to rise by the driving mechanism, so as to allow the object to move outside the inspection space.

* * * * *